W. CRONK.
HANDLE FOR PRUNING SHEARS AND THE LIKE.
APPLICATION FILED MAR. 30, 1909.
999,703.
Patented Aug. 1, 1911.
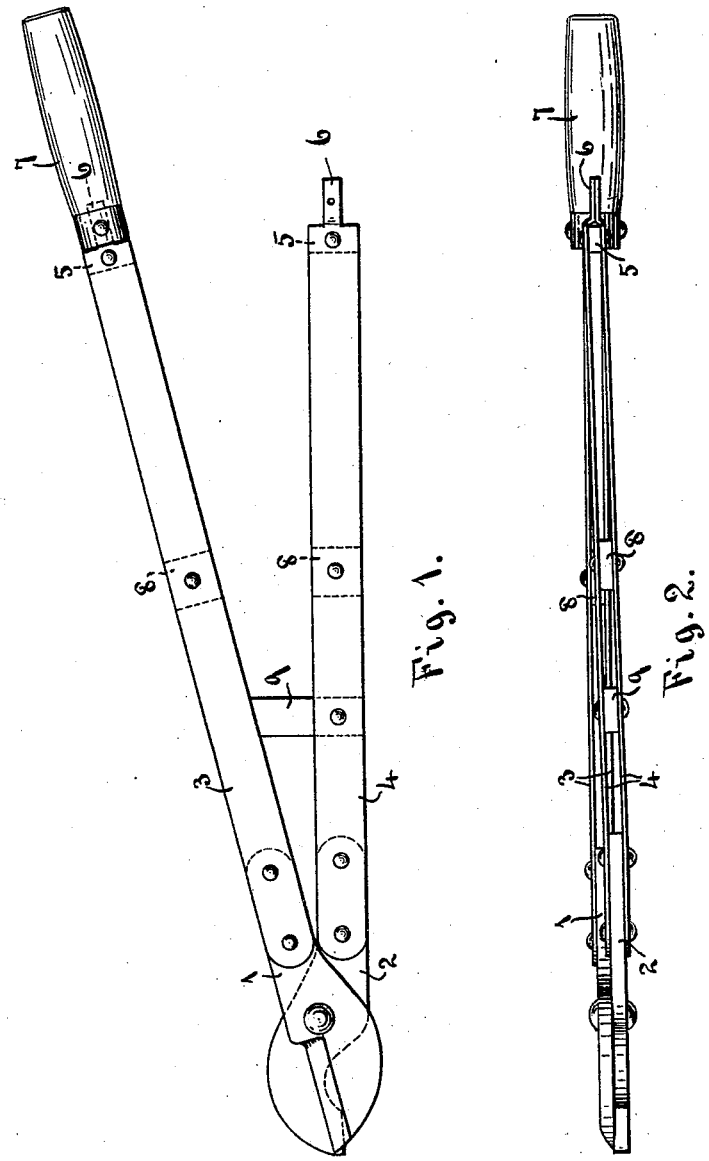

UNITED STATES PATENT OFFICE.

WILLIAM CRONK, OF MONTOUR FALLS, NEW YORK.

HANDLE FOR PRUNING-SHEARS AND THE LIKE.

999,703. Specification of Letters Patent. Patented Aug. 1, 1911.

Application filed March 30, 1909. Serial No. 486,819.

*To all whom it may concern:*

Be it known that I, WILLIAM CRONK, a citizen of the United States, residing at Montour Falls, in the county of Schuyler and State of New York, have invented certain new and useful Improvements in Handles for Pruning-Shears and the Like, of which the following is a specification.

This invention relates to improvements in the construction of long handled pruning shears and the like; my object being to provide a strong, light and cheaply constructed metal handle, as a substitute for the expensive and cumbersome wooden handles now in use.

I attain my object by constructing the handles in the manner illustrated in the accompanying drawings, in which—

Figure 1 represents a side elevation of a pruning shears equipped with my handles; and Fig. 2, a plan view thereof, looking at the underside of Fig. 1.

Like numerals designate like parts in the two views.

In applying my handles the two blades of the shears will be provided with shanks 1 and 2, of sufficient length to be riveted between pairs of light bars of steel, which make up the handles 3 and 4. These handle bar pairs are carried back to any desired length, and at their other ends are riveted together with a spacing block 5 between, the ends of the bars, where they project beyond the block 5, being cut down and bent together to form tangs 6, which are inserted in wooden hand-grips 7; said hand-grips being preferably riveted to the tangs to prevent them from being pulled off. The handle ends may, however, be otherwise constructed for the reception of hand-grips.

At one or more intermediate points, according to the length of the handles, spacer blocks 8 will be riveted in between the handle members, thereby forming in effect light trussed handles of great strength. The handles at their gripping ends will preferably be brought into alinement by bending them slightly on a reverse curve, from the shanks of the shears to the point of attachment of the hand-grips, as shown in Fig. 2. Between the members of one of the handle bars, at a suitable distance from the shears, I rivet in a stop block 9, against which one of the members of the other handle pair strikes when the blades are in closed position, as shown in Fig. 1.

What I claim as my invention and desire to secure by Letters Patent is—

1. A handle for long handled pruning shears and the like comprising a pair of bars of oblong cross section placed with their broad sides parallel to the plane of movement of the cutting blades, between which bars at one end a shank of the shears is riveted, spacer blocks riveted in between the bars adjacent the other end and at one or more intermediate points, and a hand grip fastened to the bars at said other end.

2. A handle for long handled pruning shears and the like comprising a pair of bars of oblong cross section placed with their broad sides parallel to the plane of movement of the cutting blades, between which bars at one end a shank of the shears is riveted, spacer blocks riveted in between the bars adjacent the other end and at one or more intermediate points, reduced projections on the bars extending beyond the end spacer block and bent together to form a tang, and a hand grip fastened upon said tang.

In testimony whereof I have affixed my signature, in presence of two witnesses.

WILLIAM CRONK.

Witnesses:
 E. G. CRONK,
 W. D. BOWLBY.

Copies of this patent may be obtained for five cents each, by addressing the "Commissioner of Patents, Washington, D. C."